United States Patent [19]

Niertit et al.

[11] 4,354,060
[45] Oct. 12, 1982

[54] ELECTRONIC TELEPHONE

[75] Inventors: Frank Niertit; Alvin R. Conner, both of Maitland, Fla.

[73] Assignee: Stromberg-Carlson Corporation, Tampa, Fla.

[21] Appl. No.: 60,963

[22] Filed: Jul. 26, 1979

[51] Int. Cl.³ .................... H04M 1/00; H04M 1/58
[52] U.S. Cl. ................................ 179/81 R; 179/81 A
[58] Field of Search ............... 179/81 R, 81 A, 81 B, 179/16 F, 170.2, 170.8

[56] References Cited

U.S. PATENT DOCUMENTS

| 3,955,053 | 5/1976 | Picard | 179/81 A |
| 3,987,254 | 10/1976 | Pipitone | 179/81 B |
| 4,071,713 | 1/1978 | Seneer | 179/81 A |
| 4,133,983 | 1/1979 | Moore | 179/81 B |

FOREIGN PATENT DOCUMENTS 131817 7/1978 Fed. Rep. of Germany .... 179/81 R

OTHER PUBLICATIONS

Microelectronics Opens New Prospects for Station Apparatus, by Keith Richardson, Telephony, vol. 184, No. 12, Mar. 19, 1973, pp. 51–55.
P. Luff, "The Electronic Telephone Emerges", Telesis, vol. 5, No. 7, Feb. 1978, pp. 194–200.
R. E. Holtz et al., "An Experimental Electronic Telephone", presented at N. E. C., Dec. 1969, by Bell Telephone Labs.
K. E. Preece, "Electronics In Subscribers Apparatus", Nov. 1976, by ITT.
J. Needham et al., "Digipulse; Electronics for the Home Telephone", Telesis, 1976, pp. 280–283.
"Electronic Phones on Trial", Telesis, Jun. 1978.

Primary Examiner—Joseph A. Popek
Attorney, Agent, or Firm—Finnegan, Henderson, Farabow, Garrett and Dunner

[57] ABSTRACT

An electronic telephone employing transmit and receive solid-state amplifiers having sufficiently low DC resistance to be biased by a DC signal over a pair of conductors with substantially less than four volts and having sufficiently high AC impedance for transmitting AC communication signals over and receiving AC communications from that pair of conductors. The amplifiers are directly coupled to the conductors, and the amplifiers include a transmitter section comprising a microphone and first solid state amplifier coupling the microphone to the pair of conductors, and a receiver section comprising a speaker and a solid state amplifier coupling the speaker to the pair of conductors. A shunt circuit is connected across the pair of conductors to adjust impedance characteristics of the telephone responsive to the available DC bias. A DC feedback circuit has an input coupled across the pair of conductors and an output coupled to the solid-state amplifiers, to provide a stable reference voltage to the solid-state amplifiers.

4 Claims, 2 Drawing Figures

ELECTRONIC TELEPHONE

BACKGROUND OF THE INVENTION

1. Field of the Invention

The present invention relates to a fully electronic telephone for use in a telephone network in which a DC power signal is supplied to the telephone from a central office over a pair of conductors and AC communication signals are coupled between the telephone and the central office over the same pair of conductors.

2. Description of the Prior Art

The operating environment for a telephone is often not gentle. Telephone equipment, for example, must be capable of withstanding lightning surges of thousands of volts. Furthermore, a telephone must be capable of operating under many diverse electrical conditions. For example, the audio transmit and receive network of a telephone must be capable of operating with substantially less than 4 volts power supply. For example as little as 1.8 volts power supply is typically available when the telephone is located a long distance away from a central office although higher voltages are available at locations adjacent to a central office. Telephone impedance, whether acting as a source or a load, must be capable of changing in what is an awkward manner in comparison to characteristic electronic circuit operation. Specifically, the A.C. impedance of a telephone must be high and variable with line current, and D.C. resistance must be low.

In the past, all of these varying requirements have been traditionally satisfied by non-electronic telephones which employ hybrid transformer coupling of the transmitter and receiver sections to the telephone lines. There are, however, distinct advantages in employing electronic circuits in telephones. For example, many telephone functions now considered to be extra features could be easily installed in an electronic telephone, and many features not previously available in standard telephones could be offered to attract customers such as digital display, repertory or last number dialing, calculators, clocks, printers, and more. There are also potential manufacturing economies to be realized due to reduced parts count and simpler assembly.

To meet the requirements of the present day telephone networks, an electronic telephone must be capable of operating at extremely low D.C. voltages, and must provide the necessary high A.C. impedance required to match the telephone to the network. An electronic telephone would also have to include a two-way transmission amplifier which derived its D.C. source voltage over the same lines which contain A.C. communications signals. Accordingly, an electronic telephone must exhibit a low D.C. resistance at the same time it exhibits a high A.C. impedance. Consideration must also be given to equalizing the operation of the electronic telephone so that the telephone produces a reasonably uniform operation both near and far away from the central telephone office. Finally, it is also necessary that the transmit and receive sections of an electronic telephone be arranged in such a manner that while meeting all of the above-mentioned criteria, they nevertheless provide for sidetone balance which prevents overloading of the receiver section by operation of the transmitter section.

The transmit and receive sections in standard telephones do not incorporate solid-state techniques. Even in the most advanced telephones, in which solid-state amplifiers may ocsasionally be employed, either the transmit and receive sections are coupled to the communication lines through a hybrid transformer or the transmit and receive sections are not capable of DC voltage operation substantially below 4 volts DC, for example on the order of only 1.8 volts. Indirect coupling represents a substantial cost in the manufacture of the telephone and precludes the utilization of pure integrated circuit manufacturing techniques. Failure to operate satisfactorily at low DC voltage precludes commercial acceptance in the United States.

It is, therefore, an object of the present invention to provide a reliable electronic telephone which meets the demanding design requirements necessary for successful operation in existing telephone networks.

Another object of the present invention is to provide an electronic telephone which includes a two-terminal, two-way, solid-state transmission amplifier having low D.C. resistance and high A.C. impedance.

A further object of the present invention is to provide an electronic telephone which includes a two terminal, two-way, solid-state amplifier having low D.C. resistance and high A.C. impedance and which further includes circuitry for equalizing the operation of the amplifier at various distances from a central telephone office.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a fully electronic telephone is provided for use in a telephone network in which a D.C. power signal as low as 1.8 volts is supplied to the telephone from a central office over a pair of conductors and A.C. communications signals are coupled between the telephone and the central office over the same pair of conductors. The fully electronic telephone of the present invention comprises a transmit and receive solid state amplifier circuit having sufficiently low D.C. resistance to be biased by the D.C. signal over the pair of conductors with substantially less than 4 volts DC and having sufficiently high AC impedance for transmitting A.C. communications signals over and receiving A.C. communications signals from the pair of conductors to which the amplifier is directly coupled. In a preferred embodiment, the amplifier circuit includes a transmitter section comprising a microphone and a first solid state amplifier coupling the microphone to the pair of conductors and further includes a receiver section comprising a speaker and a second solid-state amplifier coupling the speaker to the pair of conductors. A D.C. feedback circuit is coupled to provide a stable reference voltage to the first and second solid state amplifiers. Preferably the second solid-state amplifier is a differential amplifier and preferably the first and second solid state amplifiers are connected in a Wien bridge arrangement, the bridge arrangement being connected to differentiate between AC communication signals transmitted and received by the amplifier circuit for sidetone balance.

The preferred embodiment of the present invention further includes a shunt circuit connected across the pair of conductors for adjusting the impedance characteristics of the electronic telephone in response to the DC signal over the conductors. The shunt circuit preferably includes a variable shunt load across the pair of conductors and includes a circuit for adjusting the load to increase the DC current flow through the load and to decrease the AC impedance of the load as the DC voltage across the pair of conductors increases. In other words, the variable impedance shunt circuit coupled across the pair of conductors presents a selected impedance load to the amplifier circuit at low voltage and current conditions which occur near the end of the pair of conductors furthest from the central office and presents a lower impedance load to the amplifier circuit as the voltage and current conditions on the pair of conductors increase nearer to the central office to equalize the effective operation of the amplifier at a multiple of locations along the pair of conductors.

BRIEF DESCRIPTION OF THE DRAWINGS

The accompanying drawings, which are incorporated in and constitute part of the specification, illustrate a preferred embodiment of the invention and, together with the general description of the invention given above and the detailed description of the preferred embodiment given below, serve to explain the principles of the invention.

The above general description and the following detailed description are merely illustrative of the generic invention and additional modes, advantages, and particulars of this invention will be readily suggested to those skilled in the art without departing from the spirit and scope of the invention.

DESCRIPTION OF THE PREFERRED EMBODIMENT

Reference will now be made in detail to the present preferred embodiment of the invention as illustrated in the accompanying drawings.

Broadly, the present invention relates to a fully electronic telephone for use in a telephone network in which a DC power signal as low as 1.8 volts is supplied to the telephone from a central office over a pair of conductors and AC communication signals are coupled between the telephone and the central office over the same pair of conductors. The present invention, however, comprises transmit and receive solid-state amplifier means having sufficiently low D.C. resistance to be biased by the DC signal over the pair of conductors and having sufficiently high A.C. impedance for transmitting AC communication signals over and receiving AC communication signals from, the pair of conductors.

Figure 1:
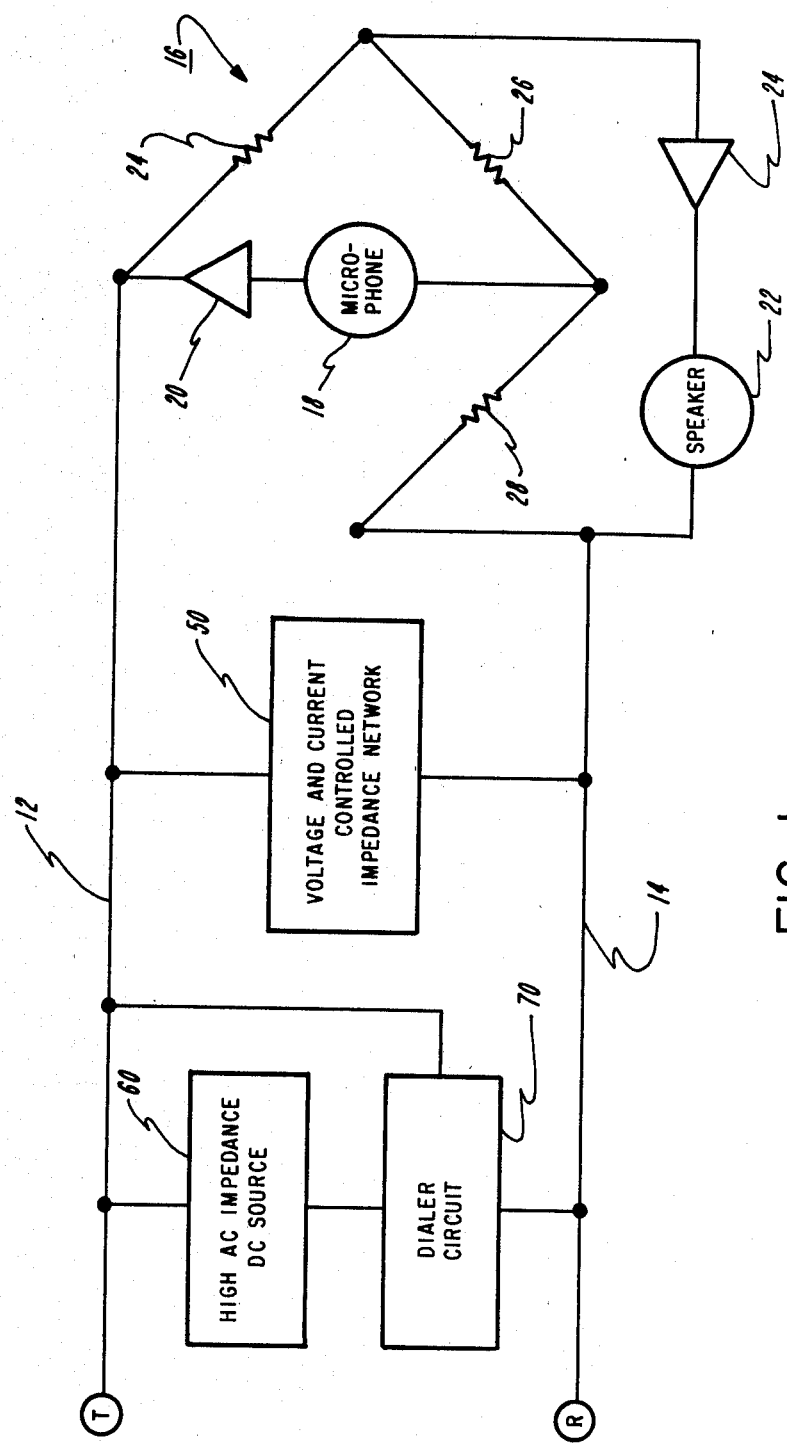
FIG. 1 is a block circuit diagram illustrating an electronic telephone in accordance with the teachings of the present invention.

For example, in the block diagram of FIG. 1, conductors 12 and 14 of an electronic telephone of the present invention, receive at terminals T and R, respectively, a DC power signal and AC communication signals from a pair of conductors originating at a central telephone office. At locations near the central office a DC voltage on the order of 10 volts might be expected at terminals T and R. However, at locations distant from the central office a DC voltage as low as 1.8 volts might be expected at terminals T and R.

The electronic telephone illustrated in FIG. 1 has a transmit and receive circuit 16 which is biased by the DC signal received over conductors 12 and 14. Transmit and receive circuit 16 is designed for transmitting AC communication signals over, and receiving AC communication signals from conductors 12 and 14. Transmit and receive circuit 16 must, accordingly, be capable of operating at DC voltages substantially below 4 volts DC and preferably as low as 1.8 volts and accordingly must be of extremely low DC resistance, for example, on the order of 200 ohms or less. At the same time, however, transmit and receive circuit 16 must have AC impedance characteristics which permit AC coupling to the overall telephone network. Accordingly, transmit and receive circuit 16 must exhibit a high AC load impedance on the order of 4–5000 ohms and must act as a source of impedance of less than 900 ohms for transmitted voice signals.

To accomplish these objectives, the transmitting means of the present invention includes a transmitter section comprising a microphone and a first solid state amplifier coupling the microphone to the pair of conductors and also includes a receiver section comprising speaker and a second solid-state amplifier coupling the speaker to the pair of conductors. Preferably, the first and second solid-state amplifiers are connected in a Wien bridge arrangement, the Wien bridge being connected to differentiate between AC communication signals transmitted and received by the amplifier means for sidetone balance.

As illustratively shown in FIG. 1, transmit and receive circuit 16 includes a transmitter section having a microphone 18 and a solid-state amplifier 20 and a receiver section comprising a speaker 22 and a solid-state amplifier 24. The transmitter and receiver sections are connected in a Wien bridge arrangement by resistors 24, 26, an 28. Specifically, resistors 24, 26 and 28 are coupled in series combination across conductors 12 and 14. The series combination of microphone 18 and amplifier 20 is coupled between the junction of resistors 26 and 28 and conductor 12. The series combination of speaker 22 and amplifier 24 is coupled between the junctions of resistors 24 and 26 and conductor 14.

Figure 2:
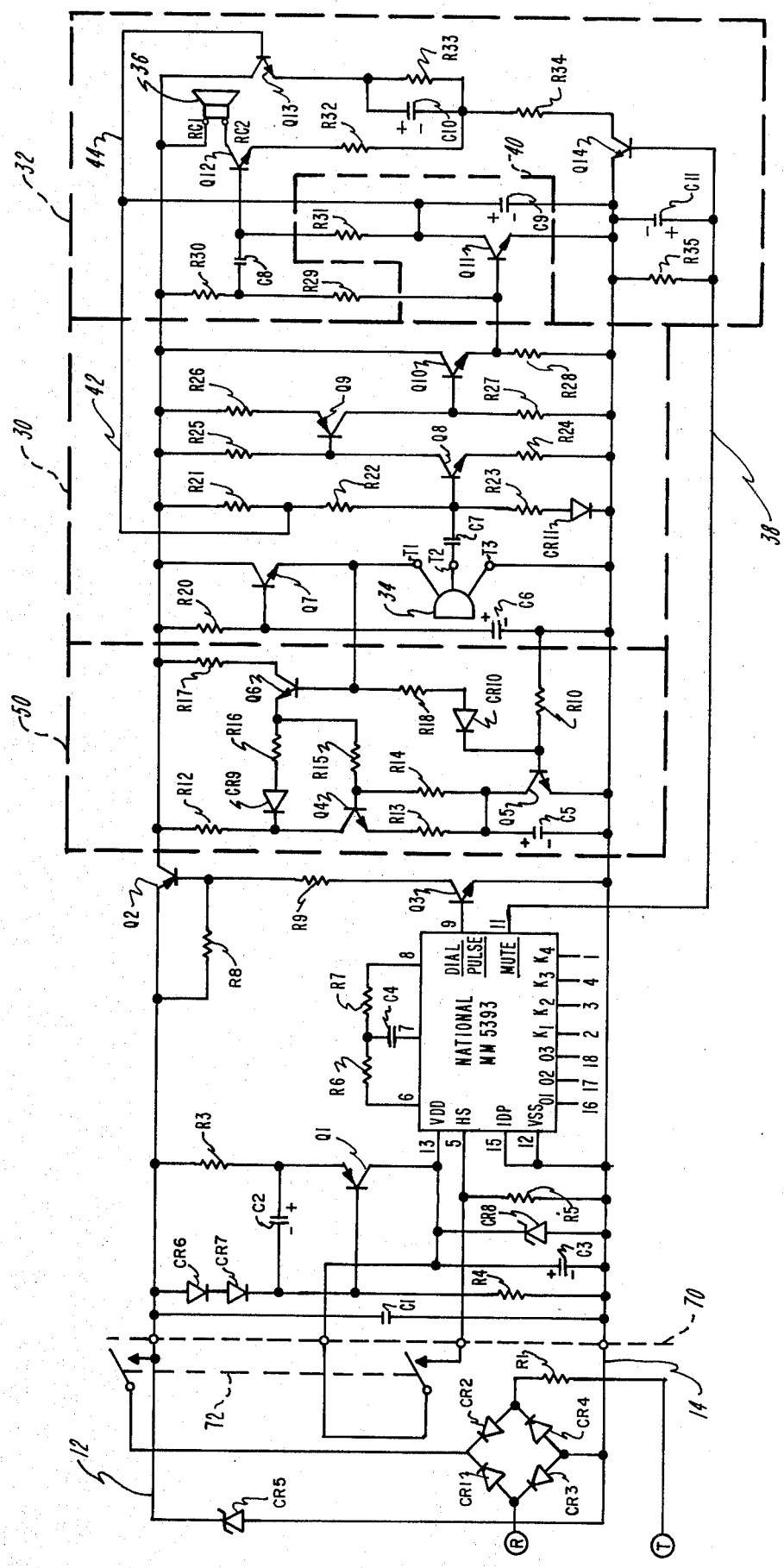
FIG. 2 is a schematic diagram of one example of an electronic telephone employing the teachings of the present invention.

A more detailed disclosure of a preferred embodiment of transmit and receive circuit 16 is illustrated in FIG. 2. Specifically, transmitter section 30 of FIG. 2 corresponds generally to microphone 18 and solid state amplifier 20 whereas receiver section 32 corresponds generally to speaker 22 and solid state amplifier 24. Resistors 24, 26, and 28 of FIG. 1 correspond generally to resistors R30, R29, and R28, respectively of FIG. 2. A more detailed description of transmitter section 30 and receiver section 32 will now follow.

Transmitter section 30 is coupled to conductors 12 and 14 and comprises transistors Q7, Q8, Q9, and Q10, microphone 34, diode CR11, capacitors C6 and C7, and resistors R20, R21, R22, R23, R24, R25, R26, R27, and R28.

Microphone 34 is preferably a condenser microphone for improved frequency characteristics and reduced DC current requirements. One such suitable microphone is presently marketed under the name ELECTRET. The DC terminals to microphone 34 are terminals T1 and T3 with terminal T1 being coupled to conductor 12 through the emitter collector path of transistor Q7 and terminal T3 being connected directly to conductor 14. The series combination of resistor R20 and capacitor C6 between conductors 12 and 14 provides a DC bias source for the base of transistor Q6 at the junction of resistor R20 and capacitor C6.

The AC output terminal of microphone 34 is terminal T2. T2 is coupled to the junction of resistors R22 and R23 through capacitor C7. The series combination of resistors R22 and R23 is coupled to conductors 12 and 14 through resistor R21 and diode CR11 respectively. The junction of resistor R22 and resistor R23 is coupled to the base of transistor Q8 with the collector of transistor Q8 coupled to conductor 12 through resistor R25 and the emitter of Q8 coupled to conductor 14 through resistor R24. The base of transistor Q9 is coupled to the collector of transistor Q8 with the emitter of transistor Q9 coupled to conductor 12 through resistor R26 and the collector of transistor Q9 coupled to conductor 14 through resistor 27. The collector of transistor of Q9 is coupled to the base of transistor Q10 whose collector is coupled directly to conductor 12 and whose emitter is connected to conductor 14 through resistor R28.

Receiver section 32 comprises speaker 36, transistors Q11, Q12, Q13, and Q14, capacitors C8, C10, and C11, and resistors R29, R30, R32, R33, R34, and R35. Speaker 36 is a standard telephone type of a few hundred ohms impedance for cost effectiveness and optimum gain. First terminal RC1 of speaker 36 is coupled directly to conductor 12 whereas second terminal RC2 of speaker 36 is coupled to the collector of transistor Q12.

Transistor Q12 and transistor Q13 are coupled in a differential amplifier configuration with the emitter of Q12 and Q13 coupled together by the series combination of resistors R32 and R33. The base of transistor Q12 is coupled through capacitor C8 to the junction of the series combination of resistors R29 and R30. Resistor R30 is in turn coupled to conductor 12 whereas resistor R29 is coupled to the junction of resistor R28 and the emitter of transistor Q10.

The collector of transistor Q13 is coupled directly to conductor 12 and a capacitor C10 is shunted across resistor R33. The junction of resistors R32 and R33 is coupled to conductor 14 through the series combination of resistor 34 and the collector-emitter path of muting transistor Q14. The sbase of muting transistor Q14 is coupled to conductor 14 by the parallel combination of resistor 35 and capacitor 11. A control signal for muting transistor Q14 is provided over conductor 38.

In accordance with the present invention, a DC feedback circuit is coupled to the amplifier means to provide a stable reference voltage to the solid-state amplifiers of the amplifier means. The stability provided by this feedback circuit enables the amplifier means to operate effectively over a large operating range of at least as low as 1.8 volts and at least as large as 10 volts DC.

As illustratively shown in FIG. 2 a preferred feedback circuit 40 comprises transistor Q11, resistor R31, and capacitor C9. The base of transistor Q11 is coupled to the junction of resistors R28 and R29, the collector is coupled to the junction of capacitor C8 and the base of transistor Q12 through resistor R31. The emitter of transistor Q11 is coupled directly to conductor 14. Capacitor C9 is shunted across the emitter-collector path of transistor Q11. The collector of Q11 is coupled to the junction of resistors R21 and R22 by conductor 42 and to the base of transistor Q13 through conductor 44.

A description of the operation of transmitter section 30, speaker section 32, and feedback circuit 40 follows.

Transistor Q7, capacitor C6, and resistor R20 make up a high impedance DC power supply for microphone 34. Capacitor C7 provides AC coupling of microphone 34 to the input of the transistor amplifiers incorporated by transistors Q8, Q9, and Q10. Transistor Q8 is the input stage whereas transistor Q10 provides an output stage. Resistors R21, R22, R23, R24, R25, R26, R27, and R28 provide DC biasing to get transistors Q8, Q9 and Q10 biased to the appropriate class and point of operation. Three amplifier stages are employed to provide a suitable gain factor and to assure that the AC impedance looking into the amplifier is high value. A high AC impedance must be presented to prevent loading down conductor 12, as is accomplished by the presence of transistor Q9 in the base of transistor Q10. Transistor Q8 also provides a high AC impedance since DC feedback circuit 40 holds the junction of resistor R21 and R22 at a constant voltage to prevent loading down by transistor Q8. Specifically, conductor 42 couples the junction of resistors R21 and R22 to conductor 14 through capacitor C9. Thus, with respect to a signal coming from conductor 12, capacitor C9 filters the junction of resistors R21 and R22 so that junction is effectively a pure DC point. The use of capacitor C9 accordingly gives transistor Q8 a high impedance input.

Resistors R21, R22, R23 are all of approximately equal value. Resistor R24 at the emitter of transistor Q8, is however, of a low value in comparison to the resistance of R23. Thus, the base of transistor Q8 will be clamped at approximately the base to emitter voltage drop above conductor 14. With the base of transistor Q8 clamped at the emitter base drop, the top of resistor 22 is required to be at approximately twice the value of that voltage drop. If any other value attempts to be established at the junction of resistors R21 and R22, then DC feedback through conductor 42 from transistor Q11 readjusts and places the required voltage at the R21-R22 junction. In summary, transmitter section 30 provides for low DC operation over a wide range of DC supply voltages, has a low DC resistance, and exhibits a high AC impedance which enables generation of AC communication signals over the very two conductors 12 and 14 which provide a DC bias supply.

In receiver section 32, transistors Q12 and Q13 make up a differential input transistor amplifier. Resistors R30, R29 and R28 divide the voltage across conductors 12 and 14 down in a ratio of approximately ⅓ to 1 and feed the voltage to the base of transistor Q12 where the voltage is amplified and fed to speaker 36. Transistor Q13 provides a balance transistor for the other side of the differential amplifier and the base of transistor Q13 is tied by conductor 44 to the constant voltage reference established at the junction of resistors R21 and R22. Thus, if transistor Q12 current varies, transistor Q13 has to vary correspondingly forming what is in effect a very high imput impedance AC amplifier.

Transistor Q14 is nothing more than a switch which opens during the generation of dialing pulses to minimize the loudness of the dialing pulses in speaker 36. Resistor R35 and capacitor C11 are just biasing elements for transistor Q14.

In summary, the amplifier circuit comprising transmitter section 30, receiver section 32, and feedback circuit 40 has very low DC operation. As set forth above this is important because in a telephone system as the distance increases from the central office the line resistance causes such a voltage drop that there is very little DC voltage left over for operation of the amplifier circuit.

The disclosed circuit being of Wien bridge configuration differentiates between transmit and receive signals for sidetone balance. Specifically in a telephone a speaker can hear his own voice due to sidetone feedback since part of the transmitted signal gets fed back to the receiver so that at least a small portion of the transmitted signal is heard through the receiver. Naturally the portion of the transmitted signal fed back to the receiver must be of minimal level so as to assure correct speech volume by the user. In the disclosed amplifier circuit of FIG. 2, transistor Q10 is the transistor which generates the transmitted signal and this signal gets divided across resistor R28. R28 is a loss element which causes a lower volume signal to be fed back to the receiver than is fed out over conductors 12 and 14 to the telephone lines. Resistor R28 is a loss element because it is in effect 180 degrees out of phase with the AC communication signals transmitted over lines 12 and 14.

Another feature of the present invention is the provision of shunt means connected across the pair of conductors for adjusting the impedance characteristics of the electronic telephone in response to the DC signal received over the conductors. More specifically, the variable impedance shunt means presents a selected impedance load to the amplifier means at low voltage and current conditions which occur near the end of the pair of conductors farthest from the central office and presents a lower impedance load to the amplifier means as the voltage and current conditions on the pair of conductors increase nearer to the central office to equalize the effective operation of the amplifier means at multiple locations along the pair of conductors.

As illustratively shown in FIG. 1, voltage and current control impedance network 50 is coupled across conductors 12 and 14 in parallel with amplifier circuit 16.

In FIG. 2, a specific and illustrative embodiment of voltage and current control impedance network 50 is shown in greater detail. Impedance network 50 is shown in FIG. 2 to preferably comprise transistors Q4, Q5, and Q6, diodes CR9 and CR10, capacitor C5, and resistors R12, R13, R14, R15, R16, R17, R18, and R19.

Resistor R12 is coupled between conductor 12 and the collector of transistor Q4 while the emitter of transistor Q4 is coupled to conductor 14 through the series of combination of resistor R13 and capacitor C5. The base of transistor Q4 is coupled to conductor 12 through the series combination of resistor R15 the emitter-collector path of transistor Q6 and resistor 17. The emitter of transistor of Q6 is coupled to the collector of transistor Q4 through the series combination of resistor R16 and diode CR9. The base of transistor Q6 is coupled to the emitter of transistor Q7 and the base of transistor Q6 is also coupled to conductor 14 through the series combination of resistor R18, diode CR10, and the base-emitter junction of transistor Q5. The collector of transistor Q5 is connected to the junction of resistor R13 and capacitor C5. The collector of Q5 is also coupled to the base of transistor Q4 through resistor R14. Resistor 19 couples the base of transistor Q5 to conductor 14.

The necessary impedance variation for equalization with changing line lengths is produced by transistors Q4, Q5 and Q6. At low voltage and current conditions of a long loop, the collectors of transistors of Q4 and Q6 present a high AC impedance load to the amplifiers in transmitter section 30 and receiver section 32. When voltage and current is increased due to a short loop, the currents through transistors Q4 and Q6 are increased, causing their collector impedances to decrease. AC impedance variation is achieved by the conduction of the diode CR9 in the CR9-R16 feedback circuit. The CR9-R-16 feedback circuit is a negative feedback which, in addition to providing variable AC impedance, assures that both DC resistance and AC impedance change will be gradual to provide a better control over the range of voltages and currents at which the telephone operates.

By providing variable AC impedance load to the amplifiers, on a long loop the telephone operation will be maximum to overcome line losses whereas on a shorter loop telephone output or performance will decrease due to increased AC load which will offset the reduced line losses and prevent an overly loud signal being generated by telephones close to the central office. In short, impedance network 50 provides regulation of the DC resistance and AC impedance to load down the circuit on short loops thereby reducing the volume of performance of the speech circuit and minimizes the load on long loops to maximize the volume and performance of the amplifier circuit 16.

In impedance network 50, transistor Q5 represents a low impedance to the network at all conditions except on the very longest loops when the junction voltage on conductors 12 and 14 goes below the sum of the voltages of the base to emitter drop of transistor Q7, the forward drop of diode CR10, and the base to emitter drop of transistor Q5. Then transistor Q5 turns off and presents a high AC impedance. This high impedance condition is particularly useful during the use of parallel extension telephones at the end of a long line which otherwise would tend to drag down the DC supply voltage on conductors 12 and 14 to an unacceptable level.

In summary, impedance network 50 senses the line DC voltage and adjusts the current through the impedance network accordingly with greater currents for greater sensed voltages. This allows operation on either short or long telephone lines. Impedance network 50 also adjusts its AC impedance conditions according to the DC conditions it has sensed. It reduces AC impedance with increased DC current and increases AC impedance with reduced DC current. However, under the minimum DC current condition, it increases rapidly both AC and DC impedance. This unique characteristic improves the use of the electronic telephone with other types of telephone sets in parallel.

High AC impedance DC source 60 illustrated in FIG. 1 is used to apply DC power to dialer circuit 70. Dialer circuit 70 may for example comprise tone dialer or pulse dialer microcircuits. DC source 60 presents high AC impedance isolation between the telephone lines and the dialer microcircuit of circuit 70, which are typically of low AC impedance.

Specific illustrative circuitry employed in DC source 60 and dialer circuit 70 of FIG. 1 is shown in FIG. 2 to illustratively comprise National Semiconductor chip MM5393, transistors Q1, Q2, and Q3, diodes CR6, CR7, and CR8, capacitors C1, C2, C3, and C4, and resistors R3, R4, R5, R6, R7, R8, and R9.

National MM5393 originates dialing pulses and drives Q3 the base of which is connected to terminal 9 and the emitter of which is connected to conductor 14. The collector of transistor Q3 is coupled through resistor R9 to the base of driver transistor Q2 whose emitter-collector path interrupts line 12. Resistor R8 is coupled between conductor 12 in the base of transistor 2 to provide biasing to transistor Q2.

Resistors R6 and R7 and capacitor C4 are a part of the pulse-generating circuit for national chip MM5393 which establishes the clocking oscillation value of the chip. Transistor Q1, resistor R3, and diode CR6 and CR7 are a high AC impedance, constant current DC source for supplying bias to the dialing chip. Zener diode CR8 and capacitor C3 provide filtering protection for the dialing chip whereas resistor R5 is a pull-down resistor for reset of the dialing chip after going on-hook. Resistor R4 provies biasing for transistor Q1 and diodes CR6 and CR7. Capacitor C1, which is coupled across conductors 12 and 14, is simply a line filter taking fast rising noise spikes off the lines. Conductor 38 couples the mute terminal of the chip to the base of transistor Q14. Like impedance network 50, transmit section 30, and receiver section 32, DC source 60 is designed to have a high AC impedance.

All of the circuitry illustrated in FIG. 2 to the right of dotted line 70 is preferably located in the hand set of a telephone whereas the circuitry to the left of dotted line 70 is preferably located in the base of the telephone. The circuitry to the left of dotted line 70 merely comprises hook switch 72, a rectifier employing diode CR1, CR2, CR3 and CR4 and surge protection elements CR5 and R1. The junction of CR1 and CR3 is coupled to the R or "ring" terminal of the telephone whereas the junction of CR2 and CR4 is coupled through resistor R1 to the T or "tip" terminal of the telephone. R1 is merely a current limiter resistor which limits current should lightning strike the system and cause conduction of diode CR5 which is coupled between conductors 12 and 14. The junction of CR3 and CR4 is coupled to conductor 14 whereas the junction of CR1 and CR2 is coupled through the upper contact of hook switch 72 to conductor 12. With the use of the diode bridge illustrated in FIG. 2 terminals R and T can be installed with either polarity.

Excellent performance has been achieved by the electronic telephone circuit illustrated in FIG. 2. The voice transmission levels measure typically 2 db above the nominal level required in REA specification PE-41 (1977). The receive level meets or exceeds the requirements of that specification. Both receive and transmit levels are made to change as set forth above depending upon the length of the telephone line to the central office in order to compensate for increased or decreased attenuation with the increased or decreased line length. The transmit level changes by −1 db and the receive level changes by 3 db.

DC resistance is maintained at or below 200 ohms. AC impedance varies between 800 ohms at low line currents and 300 ohms at high line currents. It is this factor which causes the above-described desired equalization reducing gain as the telephone approaches the central telephone office.

Dialing is done electronically through the use of integrated circuit chips. Tone generation by means of one IC chip is implemented by digitally synthesizing and combining frequencies. Levels and frequencies are sufficient to meet specification requirements. Distortion specifications are also met with a comfortable margin. Pulse dialing is achieved by an IC chip which electronically generates, through the use of logic gates and resistors, the correct make and break intervals to drive the external transistor for pulsing of the line. Speed and ratio requirements very adequately meet the specifications.

Lightning protection has been built into the telephone because some of the electrical energy from a lightning strike can possibly be routed to the telephone. The electromechanical components in older telephones inherently could withstand these energy surges. Since transistors and ICs are not as forgiving due to their small size, additional protection was required. The ability to withstand lightning surges was accomplished in part through the use of semiconductors. A series resistor is used to limit current surges. A high power semiconductor type element, namely Zener diode CR5 then limits the voltage seen by the transistors and absorbs the momentary surge of excess energy without harm. This design enables the telephone to meet or exceed specification requirements for lightning surges.

Preferred values of the components shown in FIG. 2 are as follows:

| | |
|---|---|
| Q1 = Q2 = Q9 | 2N2905A |
| Q3 = Q4 = Q5 = Q6 = Q7 = Q10 | 2N2222A |
| Q8 = Q11 = Q12 = Q13 = Q14 | 2N5962 |
| CR1 = CR2 = CR3 = CR4 | SC827 |
| CR5 | 5KP60 |
| CR6 = CR7 = CR9 = CR10 = CR11 | SC830 |
| CR8 | 1N4733 |
| C1 | .1 uF |
| C2 | 20 uF |
| C3 | 4.T uF |
| C4 | 300 pF |
| C5 | 100 uF |
| C6 | 1 uF |
| C7 = C8 | .05 uF |
| C9 = C10 | 65 uF |
| C11 | 6.8 uF |
| R1 | 22 ohms |
| R2 | 150K ohms |
| R3 | 510 ohms |
| R4 | 51K ohms |
| R5 | 100K ohms |
| R6 | 1.0M ohms |
| R7 | 56K ohms |
| R8 | 30K ohms |
| R9 | 4.7K ohms |
| R12 | 470 ohms |
| R13 | 15 ohms |
| R14 | 33 ohms |
| R15 | 33 ohms |
| R16 | 200 ohms |
| R17 | 15 ohms |
| R18 | 1.1K ohms |
| R19 | 10K ohms |
| R20 | 15K ohms |
| R21 | 10K ohms |
| R22 | 12K ohms |
| R23 | 10K ohms |
| R24 | 510 ohms |
| R25 | 2.4K ohms |
| R26 | 470 ohms |
| R27 | 3K ohms |
| R28 | 270 ohms |
| R29 | 4.7K ohms |
| R30 | 12K ohms |
| R31 | 3.3K ohms |
| R32 | 47 ohms |
| R33 | 56 ohms |
| R34 | 100 ohms |
| R35 | 510K ohms |

As stated above, the electronic telephone of the present invention has provision for increased performance in the event that parallel off-hook extensions are employed. At long loop lengths, the available voltage at the telephone is already marginally low. Taking another telephone off-hook in parallel only pulls the voltage down more. Eventually, with enough extensions off-hook, the voltage is pulled down below what is needed to operate the transistors. At this point, telephone performance begins to degrade. The electronic telephone of the present invention, gives guaranteed performance with one off-hook extension at a line out to fifteen kilofeet. Performance is also assured with two extensions out to roughly half the specified length. Up to four extensions are possible on short loops.

Additional advantages an modifications will readily occur to those skilled in the art. The invention in its broader aspects is therefore not limited to the specific details, representative apparatus, and illustrative examples shown and described. Accordingly, departures may be made from such details without departing from the spirit or scope of applicants' general inventive concept.

What is claimed is:

1. An electronic telephone for use in a telephone network in which a D.C. power signal is supplied to the telephone from a central office over a pair of conductors and A.C. communication signals are coupled between the telephone and the central office over the same pair of conductors, said electronic telephone comprising:

transmit and receive solid-state amplifier means having sufficiently low D.C. resistance to be biased by said D.C. signal over said pair of conductors with substantially less than 4 volts D.C. and having sufficiently high A.C. impedance for transmitting A.C. communication signals over, and receiving A.C. communication signals from, said pair of conductors, said amplifier means being directly coupled to said conductors and said amplifier means including a transmitter section comprising a microphone and a first solid-state amplifier coupling said microphone to said pair of conductors and a receiver section comprising a speaker and a second solid-state amplifier coupling said speaker to said pair of conductors, said transmitter and receiver sections are connected in a Wien bridge arrangement, said Wein bridge being connected to differentiate between A.C. communication signals transmitted and received by said amplifier means for sidetone balance; and a D.C. feedback circuit means having an input coupled across said pair of conductors and having an output coupled to said amplifier means for providing a stable reference voltage to said first and second solid-state amplifiers.

2. An electronic telephone for use in a telephone network in which a D.C. power signal is supplied to the telephone from a central office over a pair of conductors and A.C. communication signals are coupled between the telephone and the central office over the same pair of conductors, said electronic telephone comprising:

transmit and receive solid-state amplifier means having sufficiently low D.C. resistance to be biased by said D.C. signal over said pair of conductors with substantially less than 4 volts D.C. and having sufficiently high A.C. impedance for transmitting A.C. communication signals over and receiving A.C. communication signals from said pair of conductors, said amplifier means includes a transmitter section comprising a microphone and a first solid-state amplifier coupling said microphone to said pair of conductors an a receiver section comprising a speaker and a second solid-state amplifier coupling said speaker to said pair of conductors;

a D.C. feedback circuit means having an input coupled across said pair of conductors and having an output coupled to said amplifier means for providing a stable reference voltage to said first and second solid-state amplifiers and;

variable impedance shunt means coupled across said paid of conductors for presenting a selected impedance load to said amplifier means at low voltage and current conditions which occur near the end of said pair of conductors farthest from said central office and for presenting a lower impedance load to said amplifier means as said voltage and current conditions on said pair of conductors increase nearer to said central office to equalize the effective operation of said amplifier means at multiple locations along said pair of conductors.

3. The electronic telephone of claim 2 wherein said second solid-state amplifier is a differential amplifier.

4. The electronic telephone of claim 2 wherein said transmitter and receiver sections are connected in a Wien bridge arrangement, said Wien bridge being connected to differentiate between A.C. communication signals transmitted and received by said amplifier means for sidetone balance.

* * * * *